United States Patent
Herrera

(10) Patent No.: US 10,119,232 B2
(45) Date of Patent: Nov. 6, 2018

(54) ILLUMINATED SHOVEL ASSEMBLY

(71) Applicant: Antonio Raymundo Herrera, Fennville, MI (US)

(72) Inventor: Antonio Raymundo Herrera, Fennville, MI (US)

( * ) Notice: Subject to any disclaimer, the term of this patent is extended or adjusted under 35 U.S.C. 154(b) by 0 days.

(21) Appl. No.: 15/191,621

(22) Filed: Jun. 24, 2016

(65) Prior Publication Data

US 2017/0370058 A1 Dec. 28, 2017

(51) Int. Cl.
*F21V 33/00* (2006.01)
*E01H 5/02* (2006.01)
*F21V 23/04* (2006.01)
*A01B 1/02* (2006.01)
*F21Y 115/10* (2016.01)

(52) U.S. Cl.
CPC .......... *E01H 5/02* (2013.01); *A01B 1/02* (2013.01); *F21V 23/0492* (2013.01); *F21V 33/0084* (2013.01); *F21Y 2115/10* (2016.08)

(58) Field of Classification Search
CPC ........... F21V 33/0084; F21V 33/008; F21V 33/0044; F21V 23/0492; F21W 2111/10
USPC .......................................... 362/109, 119, 120
See application file for complete search history.

(56) References Cited

U.S. PATENT DOCUMENTS

| | | | |
|---|---|---|---|
| 3,281,586 A * | 10/1966 | Gonzalez | A45B 3/04 135/16 |
| 4,149,744 A | 4/1979 | Bonnes | |
| 4,199,181 A | 4/1980 | Mason | |
| 4,280,727 A | 7/1981 | Germain | |
| 4,559,726 A | 12/1985 | Moisan | |
| 4,991,324 A | 2/1991 | Fine et al. | |
| 5,486,027 A * | 1/1996 | Dionne | A01B 1/022 238/14 |
| 5,607,226 A * | 3/1997 | Toth | F21V 33/008 362/102 |
| 5,628,556 A * | 5/1997 | Hrabar | B25B 23/18 362/119 |
| 5,975,602 A | 11/1999 | Zan | |
| 6,290,273 B1 | 9/2001 | Moisan | |
| 6,334,640 B1 | 1/2002 | Werner et al. | |
| 7,303,452 B1 * | 12/2007 | Ertz, III | B63B 45/04 440/101 |
| 7,305,779 B1 | 12/2007 | Purvis | |
| 7,484,859 B1 * | 2/2009 | Burke | A47L 13/52 15/257.1 |

(Continued)

FOREIGN PATENT DOCUMENTS

JP S62153425 A * 7/1987

OTHER PUBLICATIONS

Yamashita, Light shovel, Jul. 8, 1987, JPS62153425A, English.*

Primary Examiner — Bryon T Gyllstrom
Assistant Examiner — James Endo
(74) Attorney, Agent, or Firm — King & Partners, PLC

(57) ABSTRACT

An illuminated shovel assembly including: an elongated shaft, wherein the elongated shaft includes a length, a first proximal end, and a second distal end; a handle sub-assembly, wherein the handle sub-assembly is secured to or forms part of the first proximal end of the elongated shaft; a blade implement, wherein the blade implement is secured to or forms part of the second distal end of the elongated shaft; and a light sub-assembly, wherein the light sub-assembly includes an energy source, a switch, and one or more light sources.

5 Claims, 6 Drawing Sheets

(56) References Cited

U.S. PATENT DOCUMENTS

| | | | | |
|---|---|---|---|---|
| 2003/0094823 A1* | 5/2003 | Bradford | A01B 1/02 | 294/51 |
| 2004/0240199 A1* | 12/2004 | Burnidge | A45C 13/28 | 362/154 |
| 2005/0160632 A1 | 7/2005 | Williams | | |
| 2006/0096625 A1* | 5/2006 | Chen | A45B 3/04 | 135/16 |
| 2006/0215391 A1* | 9/2006 | Jones | A46B 15/0002 | 362/91 |
| 2006/0249964 A1 | 11/2006 | Brazeau | | |
| 2007/0103892 A1* | 5/2007 | McDaniel | A45C 13/28 | 362/119 |
| 2009/0059570 A1* | 3/2009 | Quattrini, Jr. | A47L 13/52 | 362/119 |
| 2010/0219775 A1* | 9/2010 | Maglica | F21L 4/045 | 315/362 |
| 2010/0327766 A1* | 12/2010 | Recker | H02J 7/025 | 315/291 |
| 2012/0049550 A1* | 3/2012 | Gehman | E01H 5/02 | 294/54.5 |
| 2012/0256432 A1* | 10/2012 | Best | A01B 1/02 | 294/49 |
| 2012/0292933 A1* | 11/2012 | Krupp | E01H 1/1206 | 294/1.4 |
| 2014/0236477 A1* | 8/2014 | Chen | G01S 13/867 | 701/450 |
| 2014/0237729 A1* | 8/2014 | Saxton | B25F 1/02 | 7/116 |
| 2015/0115634 A1* | 4/2015 | Young | E01H 1/1206 | 294/1.4 |

\* cited by examiner

ILLUMINATED SHOVEL ASSEMBLY

CROSS-REFERENCE TO RELATED APPLICATIONS

Not Applicable.

BACKGROUND OF THE INVENTION

1. Field of the Invention

The present invention relates in general to an illuminated shovel assembly, and, more particularly, to an illuminated shovel assembly that protects a user during, for example, blizzards and/or low light conditions (e.g., from dusk to dawn). The shovel assemblies of the present invention preferably comprise illuminated handles, elongated shafts, and/or shovel blade implements.

2. Background Art

Shovel assemblies and associated accessories have been known in the art for years and are the subject of a plurality of patents and/or publications, including: U.S. Pat. No. 7,305,779 entitled "Snow-Shoveling Apparatus," U.S. Pat. No. 6,334,640 entitled "Snow Shovel System," U.S. Pat. No. 6,290,273 entitled "Articulated Snow Shovel," U.S. Pat. No. 5,975,602 entitled "Contoured Snow Shovel Construction," U.S. Pat. No. 4,991,324 entitled "Snow Removal Device," U.S. Pat. No. 4,559,726 entitled "Snow Mover," U.S. Pat. No. 4,280,727 entitled "Injection Molded Snow Shovel," U.S. Pat. No. 4,199,181 entitled "Snow Shovel," U.S. Pat. No. 4,149,744 entitled "Snow Shovel," United States Patent Application Publication Number 2006/0249964 entitled "Snow Shovel," and United States Patent Application Publication Number 2005/0160632 entitled "Snow Shovel"—all of which are hereby incorporated herein by reference in their entirety including all references cited therein.

U.S. Pat. No. 7,305,779 appears to disclose an apparatus that has proximal and distal end portions. The shaft includes spaced grip covers conjoined about an outer surface thereof and is provided with a centrally registered sleeve formed therein. An arcuately shaped plow section is affixed to the distal end portion and includes a heel support that has an arcuately shaped top surface for assisting to maintain the plow section registered along a horizontal plane. The plow section further includes fastening members spaced along the bottom edge for removing the bottom edge to be sharpened or replaced. The apparatus further includes a mechanism for pivoting the plow section between alternate radial paths during operating conditions. A mechanism is included for automatically biasing the plow section to an equilibrium position after the plow section is biased to a pivoted position.

U.S. Pat. No. 6,334,640 appears to disclose a snow shovel system for removing snow from a surface without requiring significant physical effort by a user. The snow shovel system includes a blade member having a first edge and a second edge, a frame attached to a rear surface of the blade member, a handle pivotally attached to the frame, and a wheel rotatably attached to the frame for maintaining the blade member in a substantially horizontal position. The handle may be rotated approximately 180 degrees with respect to the blade member for allowing the user to select which edge of the blade member will be utilized to engage the surface to be cleaned of snow which determines whether the snow is pushed to the left side or right side of the user during a forward movement.

U.S. Pat. No. 6,290,273 appears to disclose a manual snow discarding device that takes into account the security and the efficiency of the snow discarding operation. The device includes at a lower extremity of a shaft an angularly adjustable bent section having a lower end essentially vertically oriented and curved to assume the shape of part of the back of a concave blade, thereby physically increasing the height of a handle at the upper extremity of the shaft for a same angle between the shaft and an horizontal line. The shaft is also secured in place by a securing member, allowing to alternatively position the shaft of the shovel at different angles with respect to the blade depending on the use of the shovel that is to be performed and/or depending on the height of the user. This also enables persons of a large range of height to be able to use the shovel effectively with various angles to be given on the blade.

U.S. Pat. No. 5,975,602 appears to disclose a snow shovel construction including a curved and tapered blade member having an enlarged end and a smaller end. The blade member is disposed at an angle of approximately 60 degrees relative to a handle member that is provided with a pair of offset hand grip elements and further provided with a reinforcement unit disposed both on the blade member and between the blade member and the handle member.

U.S. Pat. No. 4,991,324 appears to disclose a manual snow removal device having horizontally adjustably engageable component working surfaces allowing it to clear a wide or narrow swath depending on the operator capabilities, snow depth or weight and whether a sidewalk or drive way is being cleared. Handles, which can be pivoted or extended, are affixed to the device to facilitate manual use. Trailing dolly wheels are also contemplated.

U.S. Pat. No. 4,559,726 appears to disclose snow handling equipment comprising a handle grip, a tubular handle, a blade slightly curved in cross section and rectangular in plan and a supporting device securing the blade to the handle. The supporting device allows the pivoting movement of the blade in a plane perpendicular with respect to the plane of the handle to allow the user to adjust the angle of the blade or turn the blade upside down in order to use either edge of the blade to scrape the snow.

U.S. Pat. No. 4,280,727 appears to disclose a one piece plastic injection molded snow shovel in which the blade, synthetic plastic handle stem and D-top handle are molded in one operation and a finished unit is produced from one cycle of the molding machine. A generally rectangular scoop of synthetic plastic has an integral generally cylindrical hollow handle stem extending centrally outwardly from the rear edge of the scoop. One embodiment has an inwardly reinforced cylindrical stem extending inward of the scoop for several inches from the back edge and then outward for a space normally grasped by a hand of the shoveler. A second embodiment has the handle stem entering from the back of the scoop with a section including an arcuate shell having an arc between about 220 degrees to 235 degrees and with a central reinforcing rib diametrically of the arc. The outwardly extending handle stem consists of upwardly opening arcuate shell between about 220 degrees to 235 degrees together with an upper face of an open X-crossing structure making a light but strong handle. A third embodiment has a hollow cylindrical handle stem of which almost the entire length has a plurality of spaced longitudinally extending short reinforcing projections extending radially inwardly.

U.S. Pat. No. 4,199,181 appears to disclose a device for removing snow from sidewalks, driveways, and the like. The device is used principally as a plow for pushing the snow off to one side of a snow-covered path. Force which is applied through the handle of the device is distributed over the blade equally so that the blade will not veer from the path to be plowed. The blade is formed from a trapezoidal blank and is diagonally curved to give a sidewise thrust to the snow as it is pushed along the path to be cleaned.

U.S. Pat. No. 4,149,744 appears to disclose a snow shovel including a handle and a one-piece plastic scoop so formed of a minimum amount of material as to resist wear and breakage effectively. It has a self-sharpening reinforcing leading edge, a reinforcing flange at the remainder of its peripheral edge, a series of laterally-spaced reinforcing ribs extending from the leading edge rearwardly, and a centrally-disposed reinforcing keel or rib on its back surface extending from the leading edge to its handle-receiving socket. It also has crush ribs in the socket to allow the handle dimensional variations, prevent rotation of the scoop on the handle, and maintain a snug fit.

United States Patent Application Publication Number 2006/0249964 appears to disclose a snow shovel/pusher for pushing snow forward or to one side or the other, the snow shovel having a blade and a shaft wherein the blade is connected to the shaft with a yoke mechanism for pivotally retaining the shovel blade at various side to side angles relative to the shaft, the shovel blade being pivotable relative to the shaft in a horizontal plane on a vertical central blade axis perpendicular to the working surface. The yoke mechanism is angled upward relative to the working surface to retain the shaft at a constant desirable working angle with respect to the working surface during use and during pivotal movement of the shovel blade relative to the shaft. The snow shovel also includes a releasable locking mechanism operable for releasing and relocking the shovel blade at various side to side angles relative to said shaft between an extreme right and an extreme left position.

United States Patent Application Publication Number 2005/0160632 appears to disclose a snow shovel that scoops up a pile of snow, pivot and wheels the contents to another location, whereupon operation of a lever releases its load. The telescoping frame and rotatable handle provides a selection of lockable positions. The front mounted scoop head is pivotally mounted to the lower end of the frame. Upon activation of a release lever, the scoop head is allowed to rotate downward, releasing its load. A wheel assembly mounted to an intermediate portion of the frame supports the shovel in an inclined position, allowing the user to concentrate on applying force in a forward direction rather than expending effort lifting the handle. Furthermore, the wheel assembly acts as a fulcrum whereby downward pressure on the handlebars of the shovel elevates the scoop for ease of transport. The wheel assembly may be rotated towards the frame when not in use.

In addition, various approaches have been taken toward the development of illuminating tools and/or utensils and include those disclosed in, for example, U.S. Pat. No. 8,550,516 entitled "Illuminated Shovel Tool," U.S. Pat. No. 6,419,371 entitled "Lighted Tool," U.S. Pat. No. 5,845,986 entitled "Light for Manual Rotary Tool," U.S. Pat. No. 3,976,564 entitled "Combination Digger and Sifter for Use with Metal Detector," United States Patent Application Publication Number 2014/0196922 entitled "Electric Power Tool with Improved Visibility in Darkness," United States Patent Application Publication Number 2010/0164239 entitled "Lighted Litter Scoop," United States Patent Application Publication Number 2003/0094823 entitled "Illuminated Implement Apparatus," and Chinese Patent Number 103790135 entitled "Snow Shovel with Lighting Function,"—all of which are hereby incorporated herein by reference in their entirety including all references cited therein.

U.S. Pat. No. 8,550,516 appears to disclose a shovel tool implement having an imbedded illumination means and a means for storing an auxiliary light source in its handle. The tool comprises a shaft having a proximal handle end and distal working end, the distal end preferably connecting to a shovel implement, the proximal handle end preferably having a slot in which to store a removable flashlight. At a location along the shaft length is provided an outward projection for housing a light source, power supply and on/off switch. The projection extends outward from the shaft and directs light towards the shovel working end, while the backside of the projection includes a removable cover for replacement of batteries and light source elements. The projection is situated such that normal handling of the shovel is not impeded, while the directed light allows a user to visualize a given work area in a low light environment.

U.S. Pat. No. 6,419,371 appears to disclose a lighted tool including a handle member, which has a distal end adapted to engage a blade member or other implement. A light module has a light source capable of producing a beam of light and the light module is of a size to be complimentarily received within the bore of the handle member so that the light source illuminates the blade member engaged with the distal end of the handle member. The light module is preferably detachably secured within the bore of the handle member, such as by complimentarily threaded surfaces, so that the light module is insertable into the bore and removable therefrom. Thus, the light module can be either used to illuminate the blade member and work piece when disposed within the bore of the handle member or used independently as a conventional flash light.

U.S. Pat. No. 5,845,986 appears to disclose an illuminating device for placement on a shaft of a manual rotary hand tool having a handle at a first end thereof and a workpiece-engaging adaptation at a second end thereof. The device has a body with a central aperture therethrough, at least one light source, an energy source for causing the light source to be illuminated and a switch to selectively connect or disconnect the energy source from the light source. The central aperture has an inner diameter adapted to permit the body to slide freely on the shaft. The at least one light source is aimed in the body to direct the light provided essentially coaxially with the central aperture to the workpiece-engaging shaft end.

U.S. Pat. No. 3,976,564 appears to disclose a device for use in conjunction with a metal detector which will allow the user to dig and sift simultaneously with one hand. The device includes a shovel type scoop with a flashlight built into the handle. The scoop is perforated so that it can be used in the manner of a sifter looking for metal particles or other objects. The holder or handle has a ring attachment for conveniently carrying on a belt. Optionally, the holder scoop may be magnetically treated in order to capture small metallic objects which might otherwise fit through the perforations.

United States Patent Application Publication Number 2014/0196922 appears to disclose an electric power tool that includes a motor and a motor housing at least partly encasing the motor. The motor housing has a top portion, a bottom portion opposite to the top portion, and side walls disposed between the top and bottom portions. A handle housing is connected to the bottom portion of the motor housing. A spindle is operatively connected to the motor. A first light assembly is disposed on a side wall of the motor housing.

United States Patent Application Publication Number 2010/0164239 appears to disclose a lighted litter scoop with a hollow elongate handle, an elongate shaft member, a spoon shaped member, an LED lamp, a battery power source, a battery door and an on-off switch. The elongate shaft member is fixedly attached to the front end of the handle on one end and to the spoon shaped handle on the opposite end. The LED lamp is housed at the front end of the handle portion. The LED lamp is aimed at the spoon shaped portion. The battery power source is enclosed within the hollow handle. The battery door is removable and replaceable and located on one surface of the hollow handle. The on-off switch is located on the top front surface of the handle allowing a user to hold the handle with one hand and press the on-off switch to activate the LED lamp.

United States Patent Application Publication Number 2003/0094823 appears to disclose an illuminated implement apparatus that includes a handle portion and a working member support portion connected to the handle portion. The working member support portion includes a transverse support portion connected to the handle portion and a pair of longitudinal support portions connected perpendicularly to ends of the transverse support portion. First and second working members are connected to the longitudinal support portions. A pair of lamp assemblies is connected to distal ends of the longitudinal support portions. The lamp assemblies direct illumination to a working surface. A switch assembly is housed in the handle portion and controls the lamp assemblies. A battery assembly is housed in the handle portion and powers the lamp assemblies. First and second first heating elements are contained in the respective first and second working members. The first and second working members can be in the form of shovel blades or scoops.

Chinese Patent Number 103790135 appears to disclose a snow shovel with a lighting function. The snow shovel with the lighting function comprises a handle, a shovel shaft and a shovel head, wherein the handle is connected to one end of the shovel shaft, the shovel head is connected to the other end of the shovel shaft, the handle is provided with a lighting device and a light-gathering bowl, the lighting device comprises a floodlight, a power source and a power switch, the power source provides electric energy for the floodlight, the power switch is used for controlling the floodlight to be turned on or turned off, and the light-gathering bowl is arranged above the floodlight and can gather lamplight for lighting so as to increase luminance. When no lighting condition exists at night, a user can turn on the power switch, the power source provides electric energy for the floodlight for lighting, lamplight can be gathered by the light-gathering bowl above the floodlight for lighting, then the luminance is increased, and the snow shovel can help a user remove accumulated snow rapidly.

Notwithstanding the foregoing, none of the prior art references teach or render obvious the shovel assemblies and/or apparatuses of the present invention. In particular, illuminated shovel assemblies of present invention are configured to protect a user while shoveling during snowy and/or low light conditions, rather than merely illuminating a targeted working area proximate the implement member. For these reasons, among other reasons, the present invention overcomes the prior apparatuses and assemblies for protecting a user while shoveling during snowy and/or low light conditions.

These and other objects of the present invention will become apparent in light of the present specification, claims, and appended drawings.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

SUMMARY OF THE INVENTION

Figure 1:
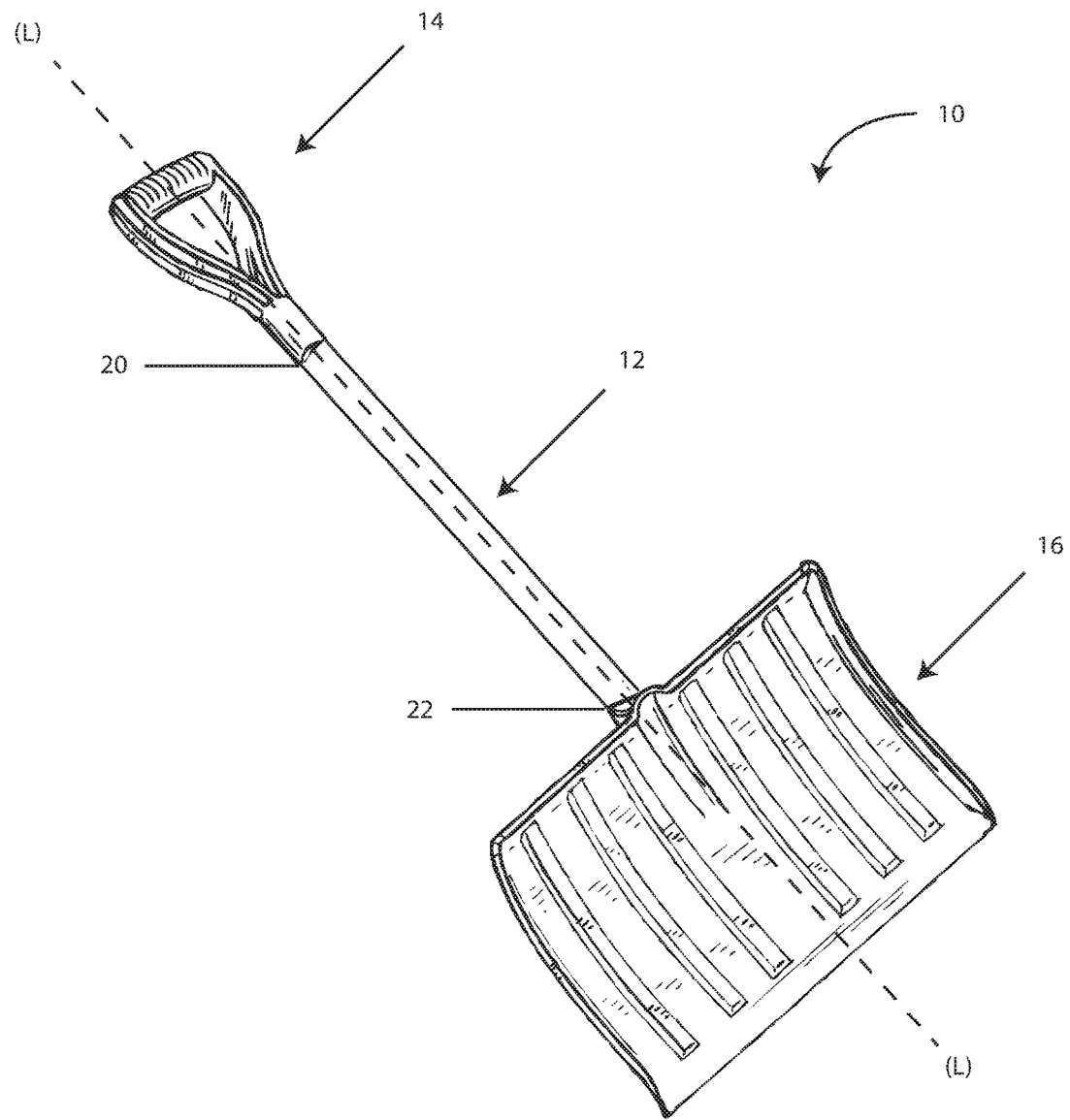
FIG. 1 of the drawings is a perspective view of an illuminated shovel assembly of the present invention in an off or non-illuminated configuration.

The present invention is directed to, in one embodiment, an illuminated shovel assembly, configured to protect a user while shoveling during snowy and/or low light conditions, comprising, consisting essentially of, and/or consisting of: (a) an elongated shaft, wherein the elongated shaft comprises a length, a first proximal end, and a second distal end; (b) a handle sub-assembly, wherein the handle sub-assembly is secured to or forms part of the first proximal end of the elongated shaft; (c) a blade implement, wherein the blade implement is secured to or forms part of the second distal end of the elongated shaft; and (d) a light sub-assembly, wherein the light sub-assembly comprises an energy source, a switch, and a first light source.

In a preferred embodiment of the present invention, the first light source emits light substantially orthogonally to and away from the length of the elongated shaft.

In another preferred embodiment of the present invention, the first light source emits stroboscopic light for alerting third parties of the presence of a user holding the illuminated shovel assembly.

In yet another preferred embodiment of the present invention, the illuminated shovel assembly further comprises a second light source, wherein the second light source is positioned at least partially within the handle sub-assembly.

In a preferred embodiment of the present invention, the second light source emits light substantially orthogonally to and away from the length of the elongated shaft.

In another preferred embodiment of the present invention, the second light source emits stroboscopic light for alerting third parties of the presence of a user holding the illuminated shovel assembly.

In yet another preferred embodiment of the present invention, the illuminated shovel assembly further comprises a third light source, wherein the third light source is associated with at least one of the elongated shaft and the blade implement.

In a preferred embodiment of the present invention, the third light source emits light substantially orthogonally to and away from the length of the elongated shaft.

In another preferred embodiment of the present invention, the third light source emits stroboscopic light for alerting third parties of the presence of a user holding the illuminated shovel assembly.

In one aspect of the present invention, the light sub-assembly comprises an energy source, an optional switch, an accelerometer, a printed circuit board, a first light source, a second light source, and a third light source.

In a preferred embodiment of the present invention, the light sub-assembly further comprises an accelerometer for providing auto-on and/or auto-off functionality of the light sub-assembly.

In one preferred embodiment of the present invention, the light sub-assembly comprises an energy source, a switch, a printed circuit board, a first light source, a second light source, and a third light source.

The present invention is also directed to, in one embodiment, an illuminated shovel assembly, configured to protect a user while shoveling during snowy and/or low light conditions, comprising, consisting essentially of, and/or consisting of: (a) an elongated shaft, wherein the elongated shaft comprises a length, a first proximal end, and a second distal end; (b) a handle sub-assembly, wherein the handle sub-assembly is secure to or forms part of the first proximal end of the elongated shaft; (c) a blade implement, wherein the blade implement is secured to or forms part the second distal end of the elongated shaft; and (d) a first light sub-assembly, wherein the first light assembly comprises: (1) an energy source, (2) a printed circuit board, (3) an accelerometer, and (4) at least one light source.

DETAILED DESCRIPTION OF THE INVENTION

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Figure 2:
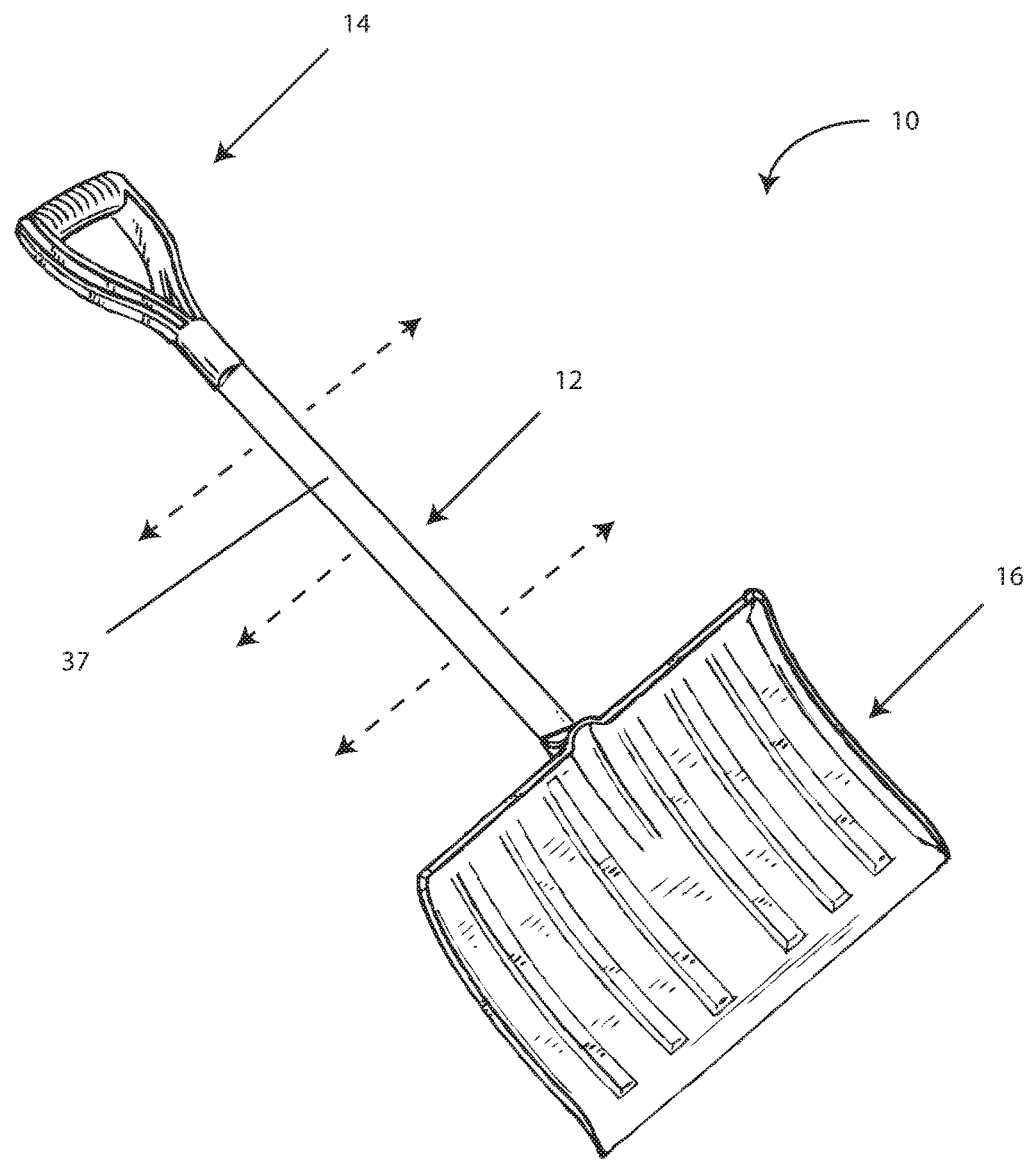
FIG. 2 of the drawings is a perspective view of an illuminated shovel assembly of the present invention, wherein the shaft is in a glowing, illuminated configuration.
Figure 3:
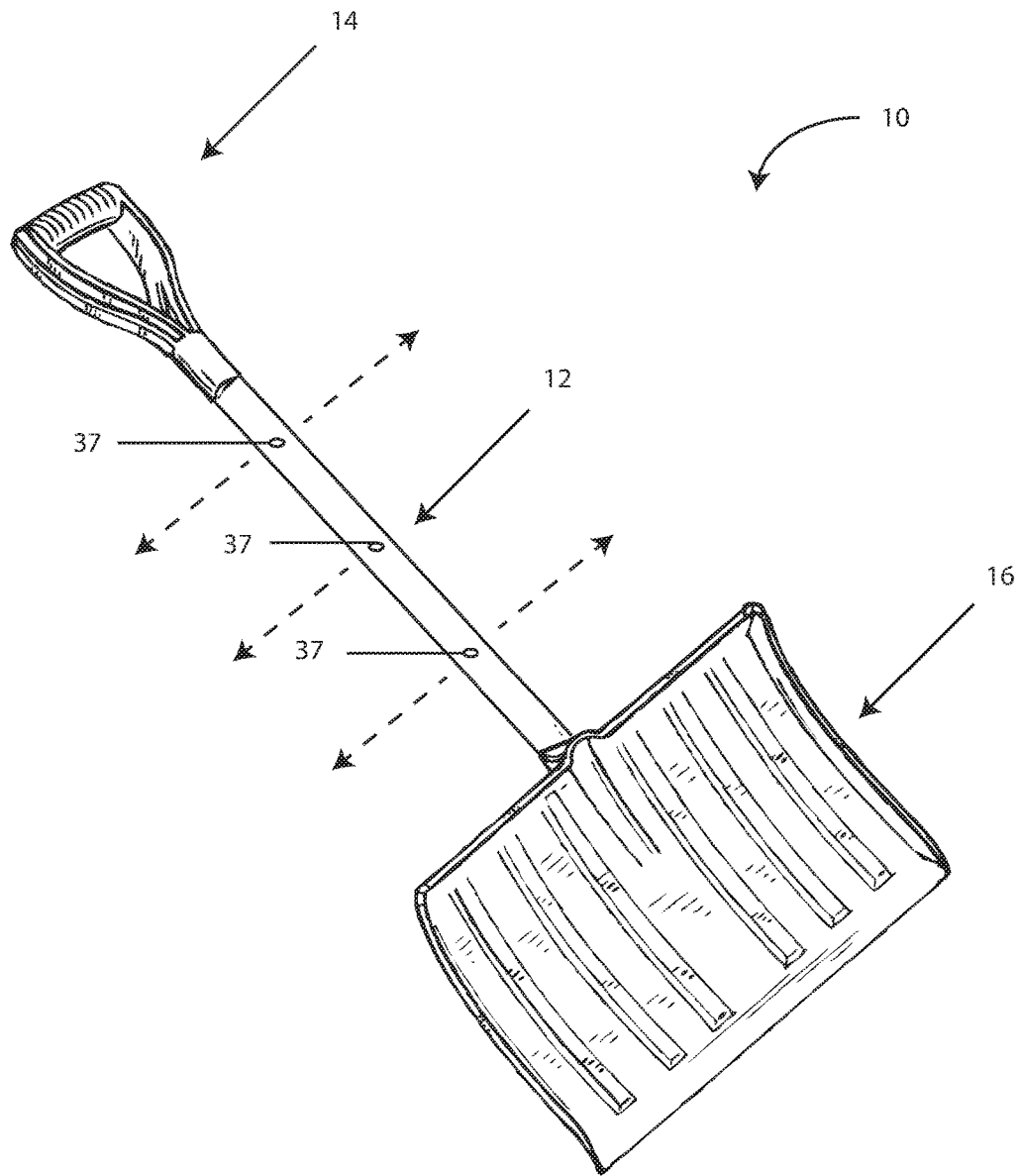
FIG. 3 of the drawings is a perspective view of an illuminated shovel assembly of the present invention, wherein the shaft is in an illuminated configuration.
Figure 4:
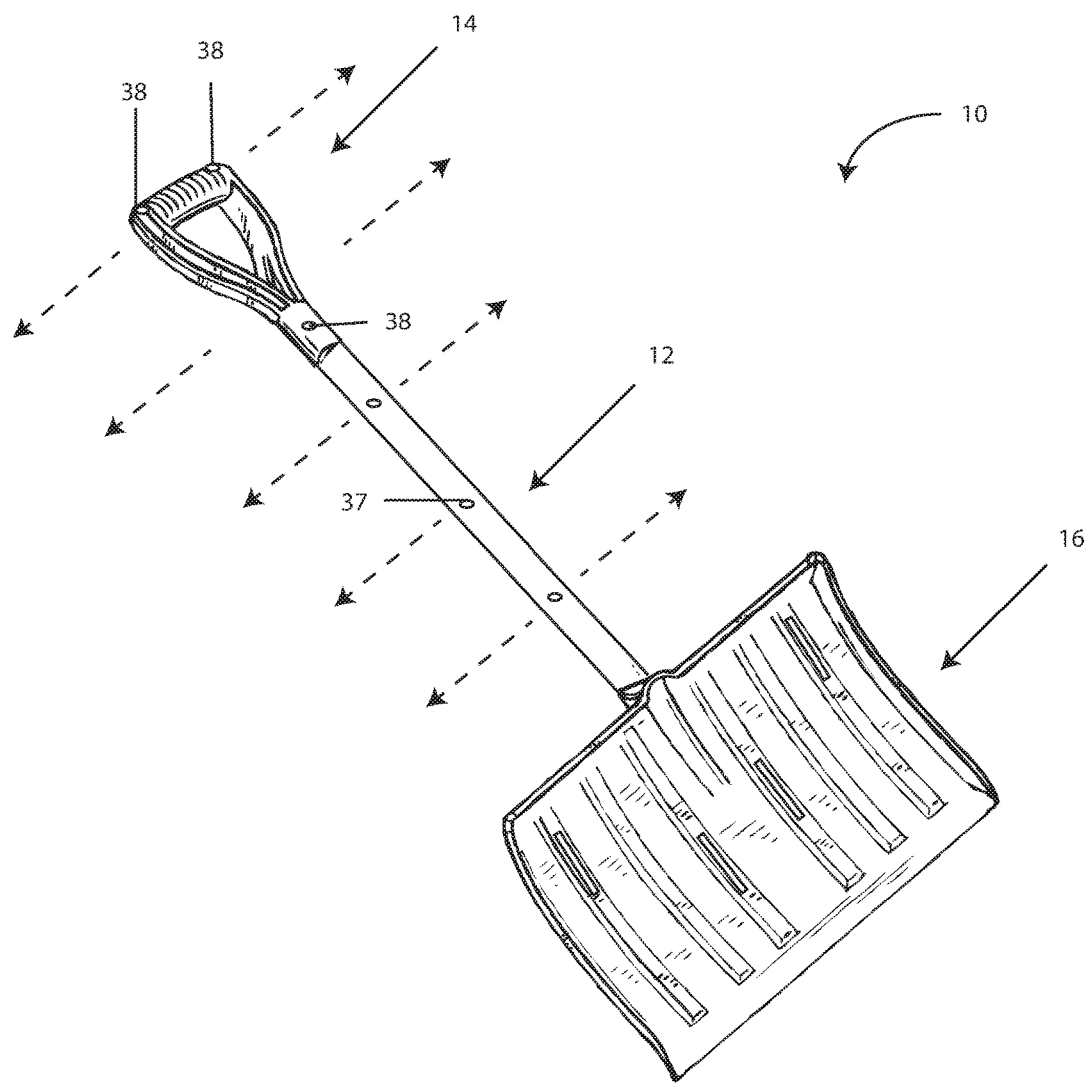
FIG. 4 of the drawings is a perspective view of an illuminated shovel assembly of the present invention, wherein the shaft, and the handle are in an illuminated configuration.
Figure 5:
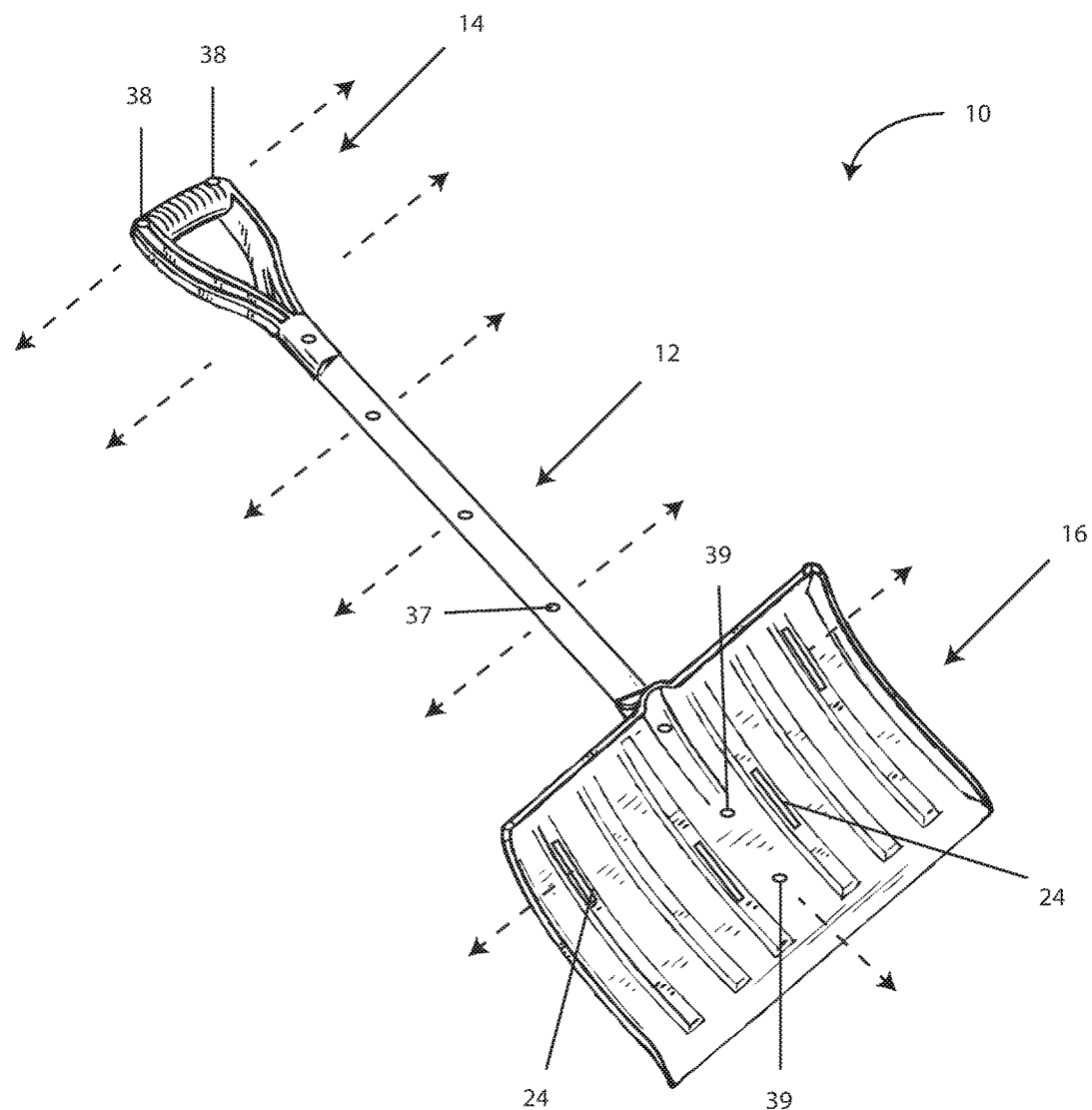
FIG. 5 of the drawings is a perspective view of an illuminated shovel assembly of the present invention, wherein the shaft, the handle, and the blade implement are in an illuminated configuration.
Figure 6:
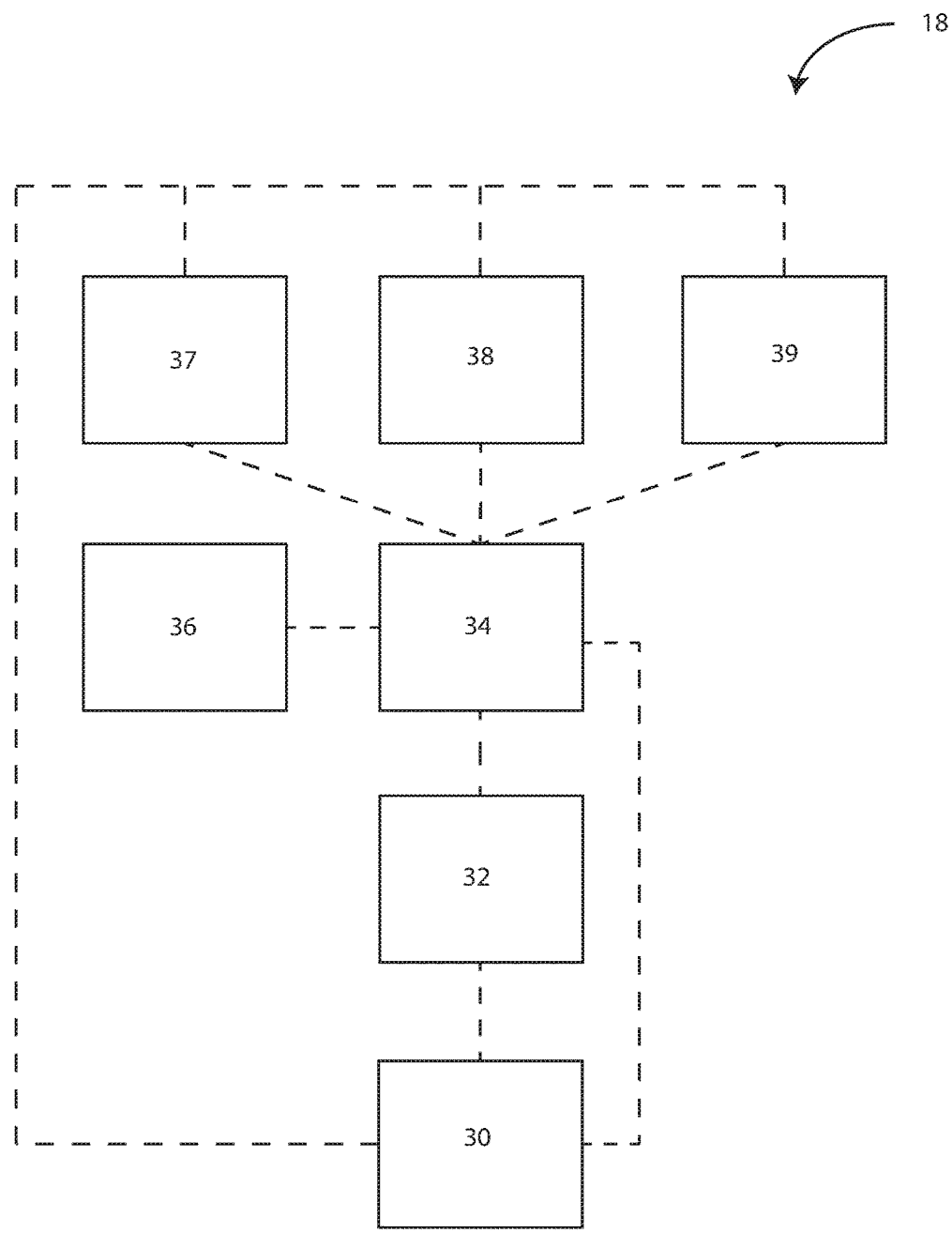
FIG. 6 of the drawings is schematic representation of the electronics of a light sub-assembly for use in accordance with the present invention.

Referring now to the drawings, and to FIGS. 1-6 collectively, illuminated shovel assembly 10 is shown as generally comprising elongated shaft 12, handle sub-assembly 14, blade implement 16, and light sub-assembly 18. In accordance with the present invention, illuminated shovel assembly 10 is configured to protect a user while shoveling during blizzards, snowy, foggy, rainy, and/or low light conditions by alerting third parties of the presence of the user and the shovel assembly.

Elongated shaft 12 comprises length (L), first proximal end 20, and second distal end 22. Elongated shaft 12 is preferably fabricated from, for example, metals (e.g. aluminum, tin, copper, nickel, titanium, steel, and alloys thereof), natural resins, synthetic resins, plastics, composites, woods, and mixtures thereof. In one embodiment, elongated shaft 12 comprises a transparent material so that when the light sub-assembly is illuminated, elongated shaft 12 exhibits glow like physical properties. Elongated shaft 12 is preferably at least one of rigid, non-flexible, and non-semi-flexible.

Handle sub-assembly 14 is preferably secured to or (if integrally fabricated) forms part of first proximal end 20 of elongated shaft 12. Handle sub-assembly 14 preferably comprises a D-top, O-top, or C-top handle, and is preferably fabricated from, for example, metals (e.g. aluminum, tin, copper, nickel, titanium, steel, and alloys thereof), natural resins, synthetic resins, plastics, composites, woods, and mixtures thereof.

Blade implement 16 is preferably secured to or (if integrally fabricated) forms part of second distal end 22 of elongated shaft 12. Blade implement 16 preferably comprises a snow blade, plow, scoop, or other removal implement, and optionally comprises reflective members and/or tape 24 (See FIG. 5). Blade implement 16 is preferably fabricated from, for example, metals (e.g. aluminum, tin, copper, nickel, titanium, steel, and alloys thereof), natural resins, synthetic resins, plastics, composites, woods, and mixtures thereof.

Light sub-assembly 18 preferably comprises energy source 30, optional switch 32, optional printed circuit board/controller 34, optional accelerometer 36, first light source 37, optional second light source 38, and optional third light source 39. In accordance with the present invention, the components of light sub-assembly 18 may be associated with and/or incorporated into elongated shaft 12, handle sub-assembly 14, blade implement 16, and/or any combination thereof. It will be understood that the light sources (e.g., 37-39) can be in direct electrical communication with energy source 30, or activated via switch 32, and/or accelerometer 36 in cooperation with printed circuit board/controller 34.

Energy source 30 is preferably at least partially contained within an internal chamber of elongated shaft 12. Energy source 30 is also preferably in electrical communication with optional switch 32, optional printed circuit board/controller 34 and one or more light source 37-39. Energy source 30 preferably comprises, for example, a primary electrochemical cell, a secondary electrochemical cell, and/or a fuel cell.

Switch 32 preferably comprises a push-button switch or five position rotary switch incorporated into elongated shaft 12 or handle sub-assembly 14 (i.e., off, first light source on, second light source on, third light source on, all light sources on). When present, switch 32 is preferably in electrical communication with printed circuit board/controller 34.

Printed circuit board/controller 34 preferably includes electronics to enable a plurality of device functionalities including, for example, flashing, pulsating and/or stroboscopic light, light color change (e.g., a tri-color (RGB) light-emitting diode), timer delay for auto-on and/or auto-off of one or more of the components of light sub-assembly 18. Printed circuit board/controller 34 is preferably at least partially contained within an internal chamber of elongated shaft 12 or handle sub-assembly 14, and is preferably in electrical communication with energy source 30, switch 32, accelerometer 36, and one or more light sources 37-39.

In a preferred embodiment of the present invention, printed circuit board/controller 34 of light sub-assembly 18 comprises one or more components, such as a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port a potentiometer, a receiver, a relay, a resistor, a semiconductor, a transformer, a transistor, a tuner, a video processing unit, a wired communications hub, and/or a wireless communications hub.

Accelerometer 36 detects when a user picks up, moves, and/or displaces illuminated shovel assembly 10, thereby enabling an auto-on, auto-off (with an optional timer delay) feature of one or more of light sources 37-39 of light sub-assembly 18. When present, accelerometer 36 is preferably in electrical communication with printed circuit board/controller 34.

Light sub-assembly 18 preferably includes first light source 37, optional second light source 38, and optional third light source 39. It will be understood that each one of the above-identified light sources may comprise one or more lights, bulbs, diodes, etcetera.

In accordance with the present invention, light sources 37-39 preferably comprise a light-emitting diode, an organic light-emitting diode, a tri-color (RGB) light-emitting diode, an incandescent bulb, a tungsten-halogen bulb, a xenon bulb, a fluorescent bulb, a compact fluorescent lamp, and/or a high-intensity discharge bulb.

One or more of light sources 37-39 preferably emit light substantially (i.e., greater than 50 percent of the emitted energy) orthogonally and/or perpendicularly, as is shown via dashed arrows in FIGS. 2-5, to and/or away from the length (L) (See FIG. 1) of elongated shaft 12. Preferably, at least one of light sources 37-39 emit flashing, blinking, pulsating and/or stroboscopic light for alerting third parties of the presence of a user holding the illuminated shovel assembly.

Light sources 37-39 are preferably in electrical communication with energy source 30 and/or printed circuit board/controller 34. First light source 37 is preferably associated with and/or incorporated into elongated shaft 12, second light source 38 is preferably associated with and/or incorporated into handle sub-assembly 14, and third light source 39 is preferably associated with and/or incorporated into blade implement 16. Third light sources 39 shine upon reflector and/or reflective tape 24 which are preferably positioned within one or more ribs of the blade implement. Third light source or sources 39 illuminate the area and/or region proximate blade implement 16 in a plurality of vectors (e.g., generally flood like dispersion) so that a user can see the snow and/or ground near the blade implement even in dark and/or inclement weather.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. An illuminated shovel assembly, configured to protect a user while shoveling during snowy and/or low light conditions, comprising:

an elongated shaft, wherein the elongated shaft comprises a length, a first proximal end, a second distal end, and an internal chamber;

a handle sub-assembly, wherein the handle sub-assembly is secured to or forms part of the first proximal end of the elongated shaft;

a blade implement having a plurality of ribs, wherein each rib comprises a front surface, and wherein a reflective member is positioned on the front surface of each rib; and, wherein the blade implement is secured to or forms part of the second distal end of the elongated shaft; and a light sub-assembly, wherein the light sub-assembly comprises an energy source positioned in the internal chamber of the elongated shaft, a switch, and a first light source positioned at least partially within the elongated shaft, wherein the first light source emits light substantially orthogonally to and away from the length of the elongated shaft, a second light source positioned at least partially within the handle sub-assembly, wherein the second light source emits light substantially orthogonally to and away from the length of the elongated shaft, and a third light source positioned at least partially within the blade implement, wherein the third light source emits light substantially orthogonally to and away from the length of the elongated shaft, and wherein the third light source emits light to the reflective member on the front surface of the plurality of ribs to illuminate an area proximate the blade implement.

2. The illuminated shovel assembly according to claim 1, wherein the first light source emits stroboscopic light for alerting third parties of the presence of the user holding the illuminated shovel assembly.

3. The illuminated shovel assembly according to claim 1, wherein the second light source emits stroboscopic light for alerting third parties of the presence of the user holding the illuminated shovel assembly.

4. The illuminated shovel assembly according to claim 1, wherein the third light source emits stroboscopic light for alerting third parties of the presence of the user holding the illuminated shovel assembly.

5. An illuminated shovel assembly, configured to protect a user while shoveling during snowy and/or low light conditions, consisting of:

an elongated shaft, wherein the elongated shaft includes a length, a first proximal end, a second distal end, and an internal chamber;

a handle sub-assembly, wherein the handle sub-assembly is secured to or forms part of the first proximal end of the elongated shaft;

a blade implement having a plurality of ribs, wherein each rib includes a front surface, and wherein a reflective member is positioned on the front surface of each rib; and, wherein the blade implement is secured to or forms part of the second distal end of the elongated shaft; and a light sub-assembly, wherein the light sub-assembly includes an energy source positioned in the internal chamber of the elongated shaft, a switch, and a first light source positioned at least partially within the elongated shaft, wherein the first light source emits light substantially orthogonally to and away from the length of the elongated shaft, a second light source positioned at least partially within the handle sub-assembly, wherein the second light source emits light substantially orthogonally to and away from the length of the elongated shaft, and a third light source positioned at least partially within the blade implement, wherein the third light source emits light substantially orthogonally to and away from the length of the elongated shaft.

\* \* \* \* \*